United States Patent

Han et al.

[11] Patent Number: 5,812,979
[45] Date of Patent: Sep. 22, 1998

[54] SYNTHESIS FILTER FOR MPEG-2 AUDIO DECODER

[75] Inventors: Young Tae Han; Jong Seog Koh; Soon Hong Kwon, all of Taejèon, Rep. of Korea

[73] Assignee: Korea Telecommunications Authority, Seoul, Rep. of Korea

[21] Appl. No.: 710,677

[22] Filed: Sep. 23, 1996

[30] Foreign Application Priority Data

Sep. 25, 1995 [KR]  Rep. of Korea ....................... 95-31605

[51] Int. Cl.[6] ....................................................... G10L 3/00
[52] U.S. Cl. ........................................... 704/501; 704/203
[58] Field of Search ................................... 704/500, 501, 704/502, 503, 504, 203, 229, 230, 216, 217, 218, 200, 201

[56] References Cited

U.S. PATENT DOCUMENTS

| 5,297,236 | 3/1994 | Antill et al. | 704/203 |
| 5,404,377 | 4/1995 | Moses | 704/232 |
| 5,508,949 | 4/1996 | Konstantinides | 704/200 |

OTHER PUBLICATIONS

IEEE Transactions on Consumer Electronics. Han et al., "An ASIC Implementation of the MPEG–2 AUdio Decoder". vol. 42, No. 3 pp. 540–545. Aug. 1996.

*Primary Examiner*—Richemond Dorvil
*Attorney, Agent, or Firm*—Merchant, Gould, Smith, Edell, Welter & Schmidt

[57] ABSTRACT

A synthesis filter for an MPEG-2 audio decoder comprising a first coefficient ROM for storing cosine matrix coefficients therein, a first queue memory for storing subband data therein, a first MAC unit for performing a matrixing operation by multiplying the subband data stored in the first queue memory by the cosine matrix coefficients stored in the first coefficient ROM, a second queue memory for storing output data from the first MAC unit therein, a third queue memory being copied with the contents of the second queue memory, a second coefficient ROM for storing window coefficients therein, a second MAC unit for synthesizing the contents copied to the third queue memory with the window coefficients stored in the second coefficient ROM to produce audio data, an FIFO memory for storing the audio data from the second MAC unit therein, a D/A converter for converting the audio data stored in the FIFO memory into an analog audio signal and outputting the converted analog audio signal to a speaker, and a controller for controlling multiplication/accumulation operations of the first and second MAC units.

17 Claims, 2 Drawing Sheets

SYNTHESIS FILTER FOR MPEG-2 AUDIO DECODER

BACKGROUND OF THE INVENTION

1. Field of the Invention

The present invention relates in general to a Moving Pictures Experts Group (MPEG) audio decoder, and more particularly to a synthesis filter for an MPEG-2 audio decoder, which is capable of enhancing a calculation speed and reducing unnecessary memory use.

2. Description of the Prior Art

Generally, a multichannel processor applies 5 channel signals to synthesis filters of the same construction, respectively. Each of the synthesis filters performs the following sequential calculations with respect to 32 subband signals in the order specified in the International Organization for Standardization/International Standardization Commission 11172-3 (ISO/IEC 11172-3)

Step 1: input new 32 subband sample values.
$S_i$,     $i = 0, \ldots, 31$                    (1)
Step 2: for $i = 1023$ down to 64 do
$V[i] = V[i - 64]$                                (2)
Step 3: for $i = 0$ to 63 do $$V_i = \sum_{k=0}^{31} N_{ik} \cdot S_k \quad (3)$$

Step 4: obtain a vector $U$ for 512 values.
for $i = 0$ to 7 do
for $j = 0$ to 31 do
$U[64i + j] = V[128 + j]$
$U[64i + 32 + j] = V[128i + 96 + j]$              (4)
Step 5: for $i = 0$ to 511 do
$W_i = U_i \cdot D_i$                             (5)
Step 6: for $i = 0$ to 31 do $$S_j = \sum_{i=0}^{15} W_j + 32i \quad (6)$$

The above calculation operation of the synthesis filter is applied in common to the MPEG1 and MPEG2 and performed individually by channels.

The synthesis filter is an element requiring an extreme calculation amount throughout a decoder. In order to implement the above calculation operation in a hardware manner, the synthesis filter must at once shift a 1024-point queue directly by 64 samples. To this end, the synthesis filter requires many data buses. Alternatively, the synthesis filter may shift data of the 1024-point queue sequentially one by one. In this case, much time is required. Furthermore, because the vectors U and W are intermediate results, there is room for removing the associated memories by means of an optimum algorithm.

SUMMARY OF THE INVENTION

Therefore, the present invention has been made in view of the above problems, and it is an object of the present invention to provide a synthesis filter for an MPEG-2 audio decoder, which is capable of enhancing a calculation speed and reducing unnecessary memory use.

In accordance with the present invention, the above and other objects can be accomplished by the provision of a synthesis filter for an MPEG-2 audio decoder comprising first storage means for storing cosine matrix coefficients therein; second storage means for storing subband data therein; first multiplication/accumulation means for performing a matrixing operation by multiplying the subband data stored in the second storage means by the cosine matrix coefficients stored in the first storage means; third storage means for storing output data from the first multiplication/accumulation means therein; fourth storage means being copied with the contents of the third storage means; fifth storage means for storing window coefficients therein; second multiplication/accumulation means for synthesizing the contents copied to the fourth storage means with the window coefficients stored in the fifth storage means to produce audio data; sixth storage means for storing the audio data from the second multiplication/accumulation means therein; digital/analog conversion means for converting the audio data stored in the sixth storage means into an analog audio signal and outputting the converted analog audio signal to a speaker; and system control means for controlling multiplication/accumulation operations of the first and second multiplication/accumulation means.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
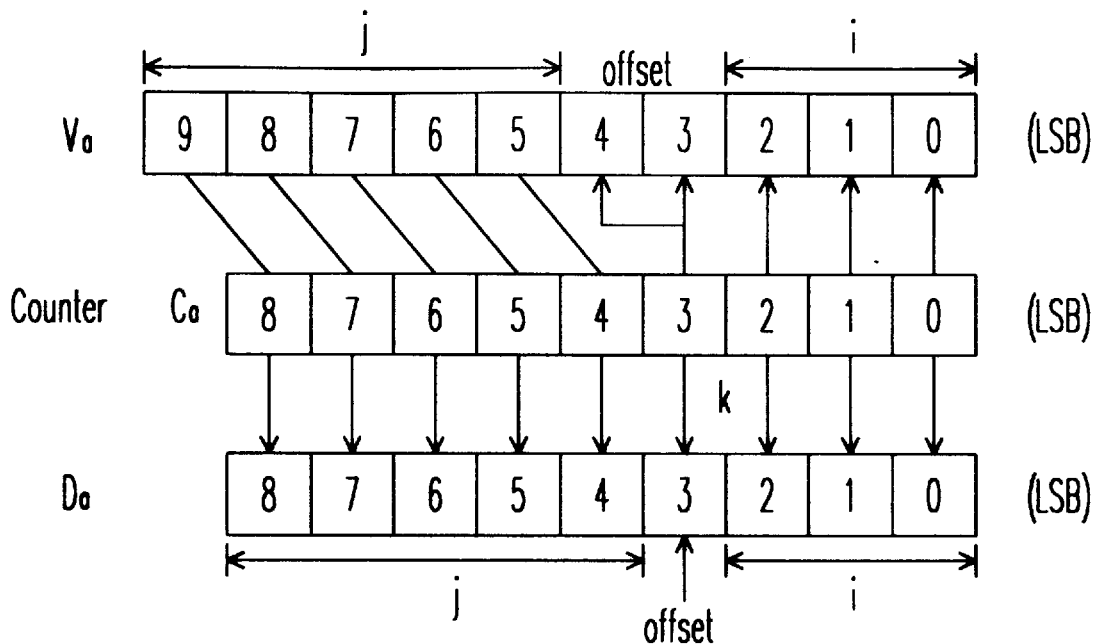
FIG. 1 is a view illustrating an address format for the implementation of an algorithm in accordance with the present invention.

The principle of the present invention is to, instead of actually shifting the data of the queue at the above step 2, set a pointer indicative of a start point of the queue and vary a value of the set pointer to obtain the same result as the shifting. To this end, there is a necessity for discriminating between a logical address being used on a software and a physical address actually being used. In other words, the 1024-point queue has a 10-bit address for the hardware implementation. The physical address is produced by adding a basic address to the logical address. Then, the same result as the shifting can be obtained by controlling the basic address. In this case, because the shifting operation is performed in the unit of 64 samples, a 4-bit register is provided for the basic address. As a result, the address addition operation is performed with respect to only higher-order 4 bits of the two addresses while lower-order 6 bits thereof are left just as they are. At this time, an adder is used to add two 4-bit operands to output lower-order 4 bits without a carry.

In order to reduce the unnecessary memory use at the above steps 3, 4, 5 and 6, $S_j$ can be mathematically expressed as follows:

$$S_j = \sum_{i=0}^{15} W_{j+32i} \quad (7)$$

$$= \sum_{i=0}^{15} U_{j+32i} \cdot D_{j+32i}$$

$$= \sum_{i=0}^{7} U_{j+64i} \cdot D_{j+64i} + \sum_{i=0}^{7} U_{j+64i+32} \cdot D_{j+64i+32}$$

$$= \sum_{i=0}^{7} V_{j+128i} \cdot D_{j+64i} + \sum_{i=0}^{7} V_{j+128i+96} \cdot D_{j+64i+32}$$

where, $0 \leq j \leq 31$.

As seen from the above equation (7), the unnecessary memory use can be reduced by removing the memories for the vectors W and U used at the intermediate calculation steps, reading operands directly from memories for values V and D, performing a multiplication operation with respect to the read operands and accumulating the multiplied results. The above equation (7) can again be expressed by the following equation (8), in which an index $V_a$ of the value V and an index $D_a$ of the value D can be expressed by the following equations (9) and (10), respectively:

$$S_j = \sum_{i=0}^{7} (V_{j+128i} \cdot D_{j+64i} + V_{j+128i+96} \cdot D_{j+64i+32}) \quad (8)$$

$$= \sum_{k=0}^{1} \sum_{k=0}^{7} V_{j+128i+96k} \cdot D_{j+64i+32k}$$

$$= \sum_{k=0}^{1} \sum_{i=0}^{7} V_{Va} \cdot D_{Da}$$

where, $0 \leq j \leq 31$.

$$V_a = j + 128i + 96k \quad (9)$$

$$= 2^7 i + (2^6 + 2^5)k + j$$

where, $0 \leq i \leq 7$, $0 \leq j \leq 31$ and $0 \leq k \leq 1$.

$$D_a = j + 64i + 32k \quad (10)$$

$$= 2^6 i + 2^5 k + j$$

where, $0 \leq i \leq 7$, $0 \leq j \leq 31$ and $0 \leq k \leq 1$.

FIG. 1 is a view illustrating an address format for the implementation of an algorithm in accordance with the present invention. As shown in this drawing, the values $V_a$ and $D_a$ in the above equations (9) and (10) can be implemented in 10-bit and 9-bit addresses, respectively. It should be noted here that offset bits of the value $V_a$ always become "00" or "11" and an offset bit of the value $D_a$ always becomes "0" or "1" according to a variation (0 or 1) of a value k. Defining $V_a[n:m]$ and $D_a[n:m]$ as mth to nth bits of the addresses $V_a$ and $D_a$, respectively, where $m \leq n$, the following result can be obtained from FIG. 1:

$$i = V_a[2:0] = D_a[2:0]$$

$$j = V_a[9:5] = D_a[8:4]$$

$$k = V_a[4:4] = V_a[3:3] = D_{a[3:3]} \quad (11)$$

Defining $C_a[n:m]$ as mth to nth bits of a new 9-bit counter $C_a$, the above equations (9) and (10) can again be expressed by the following equations (12) and (13), respectively:

$$V_a = 2^7 \bullet V_a[2:0] + (2^6 + 2^5) \bullet V_a[3:3] + V_a[9:5] \quad (12)$$

$$D_a = 2^6 \bullet D_a[2:0] + 2^5 \bullet D_a[3:3] + D_a[8:4] \quad (13)$$

The above equations (12) and (13) can be rearranged on the basis of $C_a[n:m]$ as follows:

$$V_a = 2^7 \bullet C_a[2:0] + (2^6 + 2^5) \bullet C_a[3:3] + C_a[8:4] \quad (14)$$

$$D_a = 2^6 \bullet C_a[2:0] + 2^5 \bullet C_a[3:3] + C_a[8:4] \quad (15)$$

Therefore, the values $V_a$ and $D_a$ can be simultaneously calculated by using only one 9-bit counter at the center of FIG. 1.

Now, the present invention will hereinafter be described in more detail with reference to FIGS. 2 and 3.

Figure 2:
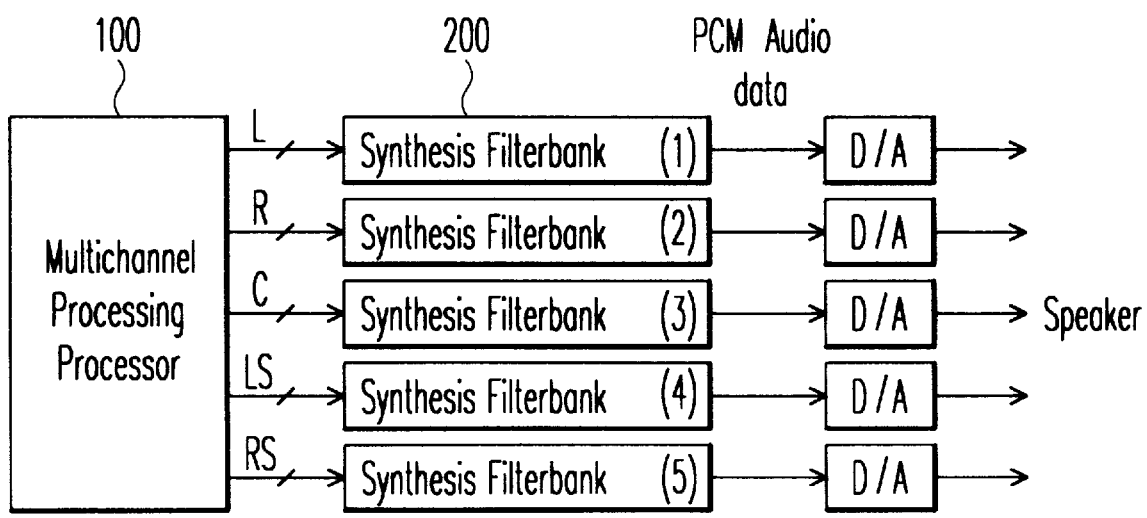
FIG. 2 is a schematic block diagram illustrating the construction of an MPEG-2 audio decoder to which the present invention is applied.

FIG. 2 is a schematic block diagram illustrating the construction of an MPEG-2 audio decoder to which the present invention is applied. As shown in this drawing, the MPEG-2 audio decoder comprises synthesis filters 200 for receiving five channel signals Lw, Rw, Cw, LSw and RSw from a multichannel processor 100, respectively. Although not shown in FIG. 2, an analysis filter is adapted to transform subband signals into a frequency domain. The synthesis filters 200 are adapted to inversely transform the subband signals into a time domain. Further, the MPEG-2 audio decoder comprises digital/analog (referred to hereinafter as D/A) converters for converting digital signals from the synthesis filters 200 into analog signals. The synthesis filters 200 perform the same calculation operation in the unit of channels.

Figure 3:
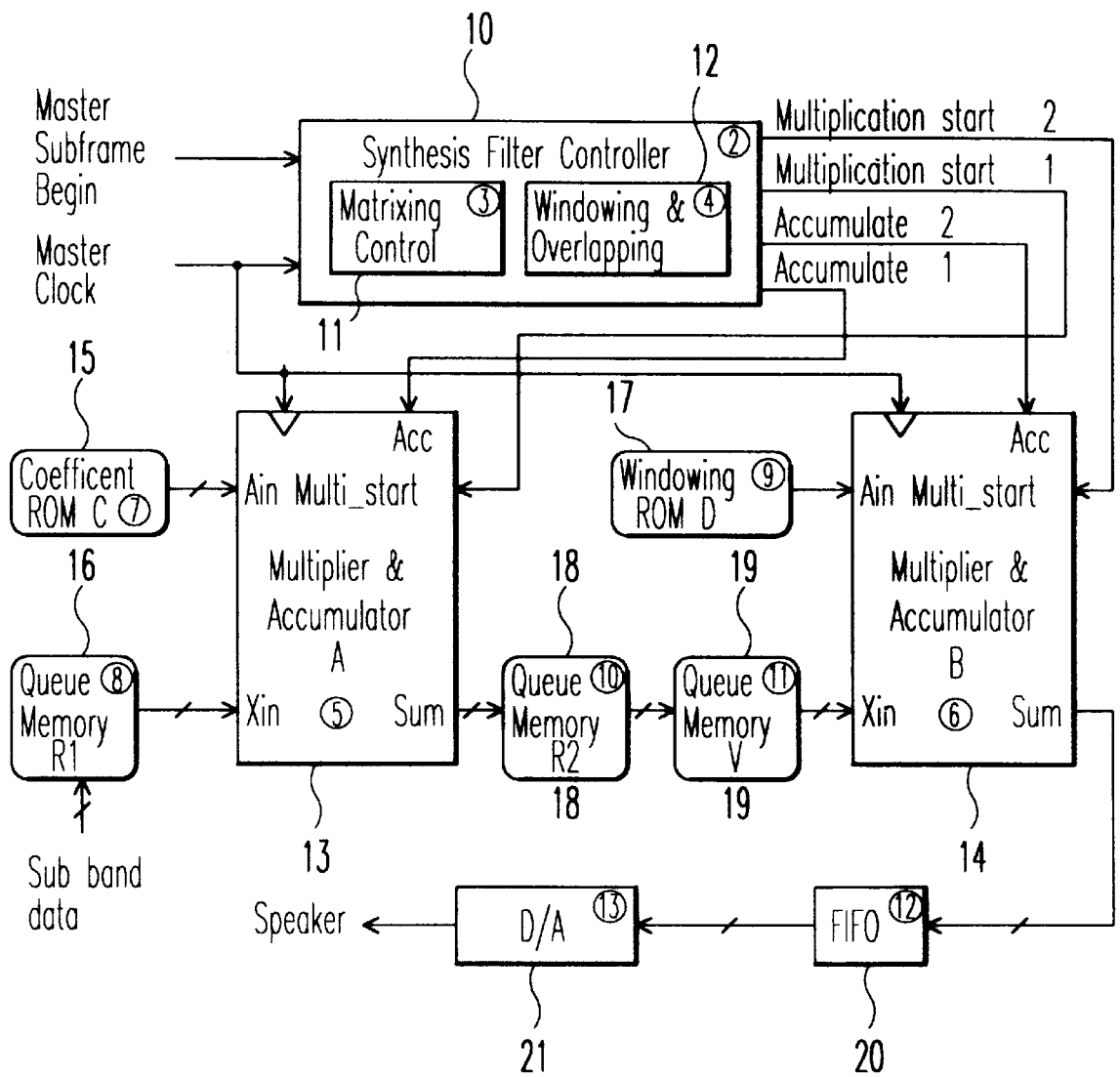
FIG. 3 is a detailed block diagram illustrating the construction of a synthesis filter in FIG. 2 in accordance with the present invention.

FIG. 3 is a detailed block diagram illustrating the construction of each synthesis filter 200 in FIG. 2 in accordance with the present invention. Each synthesis filter 200 takes charge of one channel. As shown in FIG. 3, the synthesis filter 200 comprises two multiplication and accumulation (referred to hereinafter as MAC) units A and B, 13 and 14 and one controller 10.

The controller 10 is adapted to address memories for the implementation of a simplified synthesis filter algorithm, which are arranged and used in connection with the algorithm. The controller 10 includes two control blocks being individually operated, or a matrixing control block 11 and a windowing/overlapping block 12. The matrixing control block 11 is adapted to handle the MAC unit A 13 and the windowing/overlapping block 12 is adapted to handle the MAC unit B 14. The MAC unit A 13 is adapted to perform a 64×32 matrixing operation and the MAC unit B 14 is adapted to perform a windowing/overlapping operation expressed in the above equation (8).

Although not shown in FIG. 3, each of the MAC units A and B 13 and 14 is provided with a 16×16 signed multiplier and a 36-bit accumulator for accumulating 32 31-bit multiplied values from the 16×16 signed multiplier without overflow. For the synchronization with the MAC units A and B 13 and 14, the controller 10 supplies a reset signal of active low to the MAC units A and B 13 and 14 at an interval of four clocks in a standby mode. The controller 10 generates a multiplication start signal Multi_start to start multiplication operations of the MAC units A and B 13 and 14 at the proper time and thus, to synchronize them with the address production. Also, the controller 10 generates an accumulation enable signal Acc to control accumulation operations of the MAC units A and B 13 and 14. When the accumulation enable signal Acc from the controller 10 is high in logic, the accumulators in the MAC units A and B 13 and 14 accumulate the present multiplied value. Alternately, in the case where the accumulation enable signal Acc from the controller 10 is low in logic, the accumulators in the MAC units A and B 13 and 14 are initialized to 0. The accumulator in the MAC unit A 13 is initialized to 0 whenever it performs the accumulation operation 32 times and the accumulator in the MAC unit B 14 is initialized to 0 whenever it performs the accumulation operation 16 times.

A main subframe start signal is applied to the controller 10 to inform it of time required in processing 32 subband signals. An interval between two successive main subframe start signals is the same as the time required in sampling 32 audio data in the decoder. In response to the main subframe start signal, the MAC unit A 13 performs the matrixing operation by multiplying subband data stored in a queue memory Ri 16 by cosine matrix coefficients stored in a coefficient read only memory (referred to hereinafter as ROM) C 15. Then, the MAC unit A 13 sequentially stores the multiplied results into a queue memory R2 18. The queue memory R1 16 is adapted to receive 32 subband data from a denormalization block just before the synthesis filter. At this time, writing new data from the denormalization block into the queue memory R1 16 may coincide with reading data from the queue memory R1 16 by the MAC unit A 13. To solve such a problem, the queue memory R1 16 may preferably be a bidirectional 64-word static random access memory (SRAM) dividable into two pages 0 and 1. As a result, the data read operation can be performed with respect to one page of the queue memory R1 16 while the data write operation is performed with respect to the other page of the queue memory R1 16, thereby enabling pipeline.

At the same time that the MAC unit A 13 is being operated, the controller 10 copies the results of the previous subframe stored in the queue memory R2 18 to a queue memory V 19. Then, the MAC unit B 14 synthesizes data stored in the queue memory V 19 with window coefficients stored in a coefficient ROM D 17 to produce audio data. The queue memory V 19 may preferably be a 1024-word cyclic queue memory. When the main subframe start signal is applied, the queue memory V 19 is copied with the contents of the queue memory R2 18. At this time, because the copy operation of the queue memory V 19 is performed at high speed, it hardly coincides with the write operation of the queue memory R2 18 by the MAC unit A 13. The coefficient ROMs C and D 15 and 17 are used for the matrixing and windowing operations, respectively. The coefficient ROM C 15 has a size of 2048 (64×32) words and the coefficient ROM D 17 has a size of 512 words.

The matrixing control block 11 is adapted to control the operation of the MAC unit A 13. The matrixing control block 11 resets the MAC unit A 13 continuously in the standby mode and starts the calculation operation of the MAC unit A 13 upon receiving the main subframe start signal. At this time, the total number of cycles required in the calculation operation is 8192. Also, the interval between two successive main subframe start signals is 10000 cycles. As a result, there is present a redundancy of 1808 cycles. The MAC unit A 13 is maintained in the standby mode for the remaining time after completing the calculation operation.

The windowing/overlapping block 12 is adapted to control the operation of the MAC unit B 14. First, the windowing/overlapping block 12 copies the contents of the queue memory R2 18 to the queue memory V 19. Then, when the copy operation is completed, the windowing/overlapping block 12 controls the MAC unit B 14 to perform the windowing/overlapping operation. At this time, the total number of cycles required in the copy and windowing/overlapping operations is about 5000. As a result, the MAC unit B 14 is maintained in the standby mode for at least 50% of the interval between two successive main subframe start signals. Then, the MAC unit B 14 stores 16-bit PCM audio data into a first-in-first-out (referred to hereinafter as FIFO) memory 20. A D/A converter 21 is adapted to convert the 16-bit PCM audio data stored in the FIFO memory 20 into an analog audio signal and output the converted analog audio signal to a speaker.

As is apparent from the above description, according to the present invention, the cyclic queue is used instead of the 1024-point queue for the shifting. Therefore, the calculation speed can be enhanced. Furthermore, the unnecessary memory use at the intermediate calculation steps can be reduced by integrating the calculation equations.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A synthesis filter for a Motion Pictures Experts Group-2 (MPEG-2) audio decoder comprising:

first storage means for storing cosine matrix coefficients therein;

second storage means for storing subband data therein;

first multiplication/accumulation means for performing a matrixing operation by multiplying the subband data stored in said second storage means by the cosine matrix coefficients stored in said first storage means;

third storage means for storing output data from said first multiplication/accumulation means therein;

fourth storage means being copied with the contents of said third storage means;

fifth storage means for storing window coefficients therein;

second multiplication/accumulation means for synthesizing the contents copied to said fourth storage means with the window coefficients stored in said fifth storage means to produce audio data;

sixth storage means for storing the audio data from said second multiplication/accumulation means therein;

digital/analog conversion means for converting the audio data stored in said sixth storage means into an analog audio signal and outputting the converted analog audio signal to a speaker; and system control means for controlling multiplication/accumulation operations of said first and second multiplication/accumulation means.

2. A synthesis filter for an MPEG-2 audio decoder as set forth in claim 1, wherein said system control means includes:

matrixing control means for resetting said first multiplication/accumulation means continuously in a standby mode and starting the multiplication/accumulation operation of said first multiplication/accumulation means upon receiving a main subframe start signal; and windowing/overlapping means for copying the contents of said third storage means to said fourth storage means and then controlling said second multiplication/accumulation means to perform a windowing/overlapping operation.

3. A synthesis filter for an MPEG-2 audio decoder as set forth in claim 1, wherein said system control means is adapted to connect a fourth bit k of a 9-bit counter directly to first and second addresses $V_a$ and $D_a$ and then sequentially incrementing said 9-bit counter by one from 0 to satisfy the following equation:

$$S_j = \sum_{k=0}^{1} \sum_{i=0}^{7} V_{Va} \cdot D_{Da}$$

where $S_j$ represents audio data, $V_a$=j+128i+96k, $D_a$=j+64i+32k, $0 \leq k \leq 1, 0 \leq i \leq 7$, and $0 \leq j \leq 31$.

4. A synthesis filter for an MPEG-2 audio decoder as set forth in claim 1, wherein said system control means is adapted to initialize an accumulator of said first multiplication/accumulation means whenever it performs the accumulation operation 32 times and to initialize an accumulator of said second multiplication/accumulation means whenever it performs the accumulation operation 16 times.

5. A synthesis filter for an MPEG-2 audio decoder as set forth in claim 1, wherein each of said first and second multiplication/accumulation means includes:
   a 16×16 signed multiplier; and
   a 36-bit accumulator for accumulating 32 31-bit multiplied values from said 16×16 signed multiplier without overflow.

6. A synthesis filter for an MPEG-2 audio decoder as set forth in claim 1, wherein said first storage means is a 2048-word read only memory.

7. A synthesis filter for an MPEG-2 audio decoder as set forth in claim 1, wherein said fifth storage means is a 512-word read only memory.

8. A synthesis filter for an MPEG-2 audio decoder as set forth in claim 1, wherein said fourth storage means is a 1024-word cyclic queue memory.

9. A synthesis filter for a Motion Pictures Experts Group-2 (MPEG-2) audio decoder comprising:
   a first memory having cosine matrix coefficients stored therein;
   a second memory coupled to receive and store subband data;
   a first multiplier/accumulator coupled to receive the cosine matrix coefficients from the first memory and the subband data from the second memory, to multiply the subband data and the cosine coefficients and produce output data, $V_i$;
   a third memory coupled to the first multiplier/accumulator to receive the output data therefrom;
   a fourth memory coupled to the third memory to receive a copy of data stored therein;
   a fifth memory having window coefficients, $D_i$, stored therein;
   a second multiplier/accumulator coupled to receive data from the fourth memory and the window coefficients from the fifth memory to synthesize audio data from the data from the fourth memory and the window coefficients;
   a sixth memory coupled to receive the audio data from the second multiplier/accumulator;
   a digital to analog converter coupled to the sixth memory to convert the audio data to an analog audio signal; and
   a system controller coupled to control the first and second multiplier/accumulators.

10. A synthesis filter for an MPEG-2 audio decoder as set forth in claim 9, wherein the system controller includes a matrixing controller coupled to the first multiplier/accumulator to reset the first multiplier/accumulator into a standby mode and to initiate operation of the first multiplier/accumulator in response to a main subframe start signal and also includes a window/overlap controller coupled to copy output data from the third memory to the fourth memory and to control operation of the second multiplier/accumulator.

11. A synthesis filter for an MPEG-2 audio decoder as set forth in claim 9, wherein the system controller is adapted to connect a fourth bit k of a 9-bit counter directly to first and second addresses $V_a$ and $D_a$ and then sequentially increment the 9-bit counter by one from zero to satisfy the equation:

$$S_j = \sum_{k=0}^{1} \sum_{i=0}^{7} V_{Va} \cdot D_{Da}$$

where $S_j$ represents audio data, $V_a$=j+128i+96k, $D_a$=j+64i+32k, $0 \leq k \leq 1$, $0 \leq i \leq 7$, and $0 \leq j \leq 31$.

12. A synthesis filter for an MPEG-2 audio decoder as set forth in claim 9, wherein the system controller is adapted to initialize an accumulator of the first multiplier/accumulator after the first multiplier/accumulator has performed 32 accumulation operations, and to initialize an accumulator of the second multiplier/accumulator after the second multiplier/accumulator has performed 16 accumulation operations.

13. A synthesis filter for an MPEG-2 audio decoder as set forth in claim 9, wherein each of the first and second multiplier/accumulators includes:
   a 16×16 signed multiplier; and
   a 36-bit accumulator to accumulate 32 31-bit multiplied values from the 16×16 signed multiplier without overflow.

14. A synthesis filter for an MPEG-2 audio decoder as set forth in claim 9, wherein the first memory is a 2048-word read only memory.

15. A synthesis filter for an MPEG-2 audio decoder as set forth in claim 9, wherein the fifth memory is a 512-word read only memory.

16. A synthesis filter for an MPEG-2 audio decoder as set forth in claim 9, wherein the fourth memory is a 1024-word cyclic queue memory.

17. A synthesis filter for an MPEG-2 audio decoder as set forth in claim 9, wherein the second memory is a static random access memory dividable into two pages, wherein a first page is couplable to the first multiplier/accumulator while the other page is available for receiving subband data.

* * * * *